UNITED STATES PATENT OFFICE.

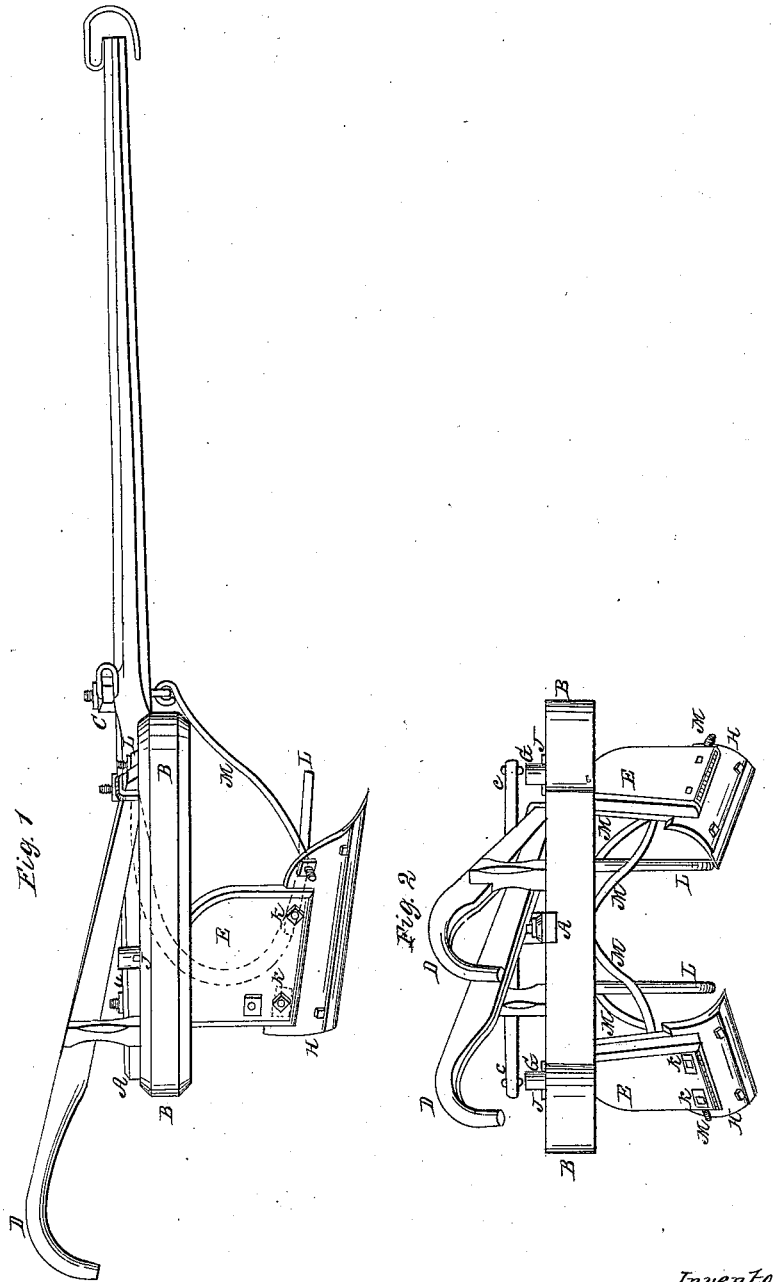

ELIAS MINNICH, OF MacKEE'S HALF FALLS, PENNSYLVANIA.

IMPROVEMENT IN CULTIVATORS.

Specification forming part of Letters Patent No. 46,376, dated February 14, 1865.

*To all whom it may concern:*

Be it known that I, ELIAS MINNICH, of MacKee's Half Falls, Snyder county, State of Pennsylvania, have invented new and useful Improvements in Corn-Plows; and I do hereby declare that the following is a full and exact description thereof, reference being had to the accompanying drawings, and to the letters of reference marked thereon, making a part of this specification.

The nature of my invention consists in connecting the adjustable plowshares to the tongue by bracing-rods, and the arrangement of the teeth as fastened to the front of the angular-shaped frame, and all in combination with the angular frame.

Figure 1 represents a side elevation, and Fig. 2 a perspective view, of the machine.

A represents the tongue or beam of the plow as attached on the top and across the center of the angular-shaped frame B by screw-bolts; C, the double-tree to which the horses are hitched; D, the handles of the plow, set obliquely to the tongue and bolted to the right side of the frame B at top.

E are upright supports that turn on a pivot or post, G, passing through the frame B at each side. These supports are reversible, so as to move the plowshares H wider or narrower in front, as required, and they are tightened by bolts or pins J at the top of the frame B. The plowshares H are adjustable on slots K, through which the bolts pass, and are fastened to the supports E. At the front part of the frame B two teeth, L, are bolted that curve downward, with their points to the front, to operate as rake-teeth to collect stubble, weeds, &c., as the plow is operating. Iron rods M M are fastened permanently to the tongue A of the plow and to the front end of the shares H and rear end of the supports E to brace the plowshares H and bind the whole machine firmly together.

The advantage of this combination of devices is to regulate the width of the furrow and clear the rows of corn from weeds, &c.

I do not claim the shape of the frame or the adjustable plowshares or raking-teeth as heretofore used; but

What I claim as my invention, and desire to secure by Letters Patent, is—

The arrangement of the iron braces M M, connecting the plowshares to the tongue, with the teeth or rake L, as arranged and combined with the angular-shaped frame B, as herein described, and for the purposes set forth.

ELIAS MINNICH.

Witnesses:
LEVI S. HENOLD,
WILLIAM M. HAINS.